(12) United States Patent
Cheon et al.

(10) Patent No.: US 11,491,957 B2
(45) Date of Patent: Nov. 8, 2022

(54) ELECTRONIC HYDRAULIC BRAKE DEVICE AND CONTROL METHOD THEREOF

(71) Applicant: HYUNDAI MOBIS CO., LTD., Seoul (KR)

(72) Inventors: Se Young Cheon, Yongin-si (KR); Jae Il Lim, Yongin-si (KR); Bong Geun Cho, Yongin-si (KR); Jae Woong Hur, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 254 days.

(21) Appl. No.: 16/849,730

(22) Filed: Apr. 15, 2020

(65) Prior Publication Data

US 2020/0331442 A1   Oct. 22, 2020

(30) Foreign Application Priority Data

Apr. 18, 2019   (KR) .................. 10-2019-0045336

(51) Int. Cl.
*B60T 13/66*   (2006.01)
*B60T 8/17*    (2006.01)
(Continued)

(52) U.S. Cl.
CPC .................. *B60T 8/17* (2013.01); *B60Q 9/00* (2013.01); *B60T 8/1755* (2013.01); *B60T 8/4081* (2013.01); *B60T 13/62* (2013.01); *B60T 7/12* (2013.01); *B60T 2260/08* (2013.01); *B60T 2270/30* (2013.01); *B60T 2270/402* (2013.01); *B60T 2270/404* (2013.01); *B60T 2270/413* (2013.01); *B60T 2270/82* (2013.01)

(58) Field of Classification Search
CPC ..... B60T 8/17; B60T 8/40; B60T 8/92; B60T 8/94; B60T 13/62; B60T 13/66; B60T 13/74; B60T 13/662; B60T 13/745
USPC ................................. 303/114.1; 701/70, 72
See application file for complete search history.

(56) References Cited

U.S. PATENT DOCUMENTS 11,046,330 B1 *  6/2021  Katzourakis .......... B60W 10/04
2017/0341630 A1 * 11/2017  Zipfel .................. B60T 11/103
(Continued)

FOREIGN PATENT DOCUMENTS

DE   102016211982 A1 *  1/2018 ............. B60T 13/66
DE   102017217856 A1 *  4/2019 ............. B60T 1/005
(Continued)

*Primary Examiner* — Christopher P Schwartz
(74) *Attorney, Agent, or Firm* — Morgan, Lewis & Bockius LLP (57) ABSTRACT

An electronic hydraulic brake device may include: a brake unit including a main brake unit configured to provide braking hydraulic pressure to a plurality of wheel cylinders through an operation of a motor, and an auxiliary brake unit connected to the main brake unit so as to be filled with high braking hydraulic pressure, and configured to provide braking hydraulic pressure to the plurality of wheel cylinders when an operation error of the main brake unit occurs; a first control unit configured to control the operation of the brake unit, and configured to control the auxiliary brake unit to operate when an operation error of the main brake unit occurs; and a second control unit configured to assist a part of the control of the main brake unit controlled by the first control unit and the control of the auxiliary brake unit.

10 Claims, 8 Drawing Sheets

(51) Int. Cl.
*B60T 8/40* (2006.01)
*B60T 13/62* (2006.01)
*B60Q 9/00* (2006.01)
*B60T 8/1755* (2006.01)
*B60T 7/12* (2006.01)

(56) References Cited

U.S. PATENT DOCUMENTS

| | | | | |
|---|---|---|---|---|
| 2018/0215368 | A1* | 8/2018 | Isono | B60T 13/748 |
| 2018/0345938 | A1* | 12/2018 | Rebholz-Goldmann | B60T 13/741 |
| 2019/0047538 | A1* | 2/2019 | Lesinski | B60T 8/885 |
| 2019/0092304 | A1* | 3/2019 | Ganzel | B60T 13/686 |
| 2020/0406869 | A1* | 12/2020 | Hwang | B60T 17/22 |
| 2020/0409360 | A1* | 12/2020 | Hwang | B60W 60/0015 |
| 2021/0053540 | A1* | 2/2021 | Besier | B60T 8/885 |
| 2021/0380088 | A1* | 12/2021 | Yoo | B60T 1/10 |

FOREIGN PATENT DOCUMENTS

| | | | |
|---|---|---|---|
| EP | 3385934 A1 * | 10/2018 | B60T 17/221 |
| KR | 10-2015-0103905 A | 9/2015 | |

* cited by examiner

| | | Data 1 | | |
|---|---|---|---|---|
| M to S1 Message | Time[Counter] | Control Mode | Fault Mode | Checksum |

| | Data 2 |
|---|---|
| M to S2 Message | Actuator Command |

| | | Data | | | |
|---|---|---|---|---|---|
| S1 to M Message | Time[Counter] | Slave State | Control Mode | ASIC State | Checksum |

| | Data |
|---|---|
| S2 to MCU Message | Actuator & I/O Measurement Data ,AISC State |

| | | Normal state | Fault of main brake unit | Fault of auxiliary brake unit | Fault of second control unit | Fault of main & auxiliary brake unit | Fault of main brake unit and second control unit | Fault of auxiliary brake unit and second control unit | Fault of all controllers |
|---|---|---|---|---|---|---|---|---|---|
| First-first control unit | | Main brake unit control | Stop | Main brake unit control | Main brake unit control | Stop | Stop | Main brake unit control | Stop |
| First-second control unit | First-second-first control unit | Stability control | Stability control | Stop | Stability control | Stop | Stability control | Stop | Stop |
| | First-second-second control unit | Check pressure of auxiliary accumulator in waiting state | Auxiliary brake unit control | Stop | Check pressure of auxiliary accumulator in waiting state | Stop | Auxiliary brake unit control | Stop | Stop |
| Second control unit | (Stability control) | Check auxiliary brake unit in waiting state | Check auxiliary brake unit in waiting state | Stability control | Stop | Stability control | Stop | Stop | Stop |
| | (Auxiliary braking control) | Check auxiliary brake unit in waiting state | Check auxiliary brake unit in waiting state | Check pressure of auxiliary accumulator in waiting state | Stop | Auxiliary brake unit control | Auxiliary brake unit control | Stop | Stop |
| Warning unit | | None | Turn on warning light for main brake unit abnormality | Turn on warning light for auxiliary brake unit abnormality | Turn on warning light for second control unit fault and output warning sound | Turn on control light for second control unit fault and output warning sound | Turn on control light for second control unit fault and output warning sound | Turn on all warning lights and output warning sound | Turn on all warning lights, output warning sound, and turn on auxiliary brake operation light |
| Travel or not | | Travel | Travel | Travel | Induce driver to drive | Induce driver to drive | Induce driver to drive | Induce driver to stop | Induce driver to stop, and operate auxiliary brake |

ELECTRONIC HYDRAULIC BRAKE DEVICE AND CONTROL METHOD THEREOF

CROSS-REFERENCE TO RELATED APPLICATION

This application claims priority from and the benefit of Korean Patent Application No. 10-2019-0045336, filed on Apr. 18, 2019, which is hereby incorporated by reference for all purposes as if set forth herein.

BACKGROUND

Field

Exemplary embodiments of the present disclosure relate to an electronic hydraulic brake device capable of reliably securing the braking stability of a vehicle, and a control method thereof.

Discussion of the Background

The development trend of electric/hybrid vehicles has been focused on autonomous vehicles, and a fault of an electronic brake device in an autonomous vehicle presents a serious risk to a passenger during driving. Examples of the fault of the electronic brake device include a hydraulic device fault, a power device fault and a control device fault. Among the faults, the control device fault has the highest risk level.

In the related art, one MCU (Micro Control Unit) uses multiple cores to concentrate on monitoring a fault between the cores, and a backup mechanical brake device is installed to prepare for a complete fault of the MCU. That is, when the main MCU is damaged, braking control is stopped, and a driver needs to operate the mechanical brake device to stop the vehicle. In this case, the driver needs to pay attention to the state of the vehicle even in an autonomous mode (SCC mode), in order to secure braking stability. However, since it is difficult to request the driver to pay attention to the vehicle operation state in such a situation that the autonomous vehicles are developed to aim for fully autonomous driving, the backup mechanical brake device may not protect the driver any more.

In order to operate an autonomous driving system, a brake device needs to be used, which operates according to a command of the autonomous driving system or a driver's braking command. Currently, a hydraulic brake device using a motor pump or a mechanical brake device using a motor is used, and referred to as a main brake device. Furthermore, the autonomous driving system is configured so that a backup brake device by a driver's operation can be used at the same time because a malfunction or fault of the main brake device may occur during driving. When a braking command is issued while a vehicle is driven by a driver, the driver may cope with a fault of the main brake device using the backup brake device because the driver steers the vehicle. However, in the autonomous mode in which a driver's intervention is minimized or a driver does not intervene in operation, the driver cannot cope with a fault of the main brake device or a response time delay inevitably occurs.

The related art is technical information which the present inventor has retained to derive the present disclosure or has acquired during the process of deriving the present disclosure. The related art is not necessarily a publicly known technique which is published to the public before the application of the present disclosure.

RELATED ART DOCUMENT

Patent Document (Patent Document 1) Korean Patent Application No. 2015-0103905

SUMMARY

Various embodiments are directed to an electronic hydraulic brake device which includes an auxiliary brake device to assist a main brake device and operates the auxiliary brake device in case of a fault of the main brake device in order to stably brake a vehicle without a driver's operation, and a control method thereof.

Various embodiments are directed to an electronic hydraulic brake device which includes a main control unit for controlling the electronic brake device and a sub control unit for monitoring the main control unit, and control the sub control unit to perform braking control in place of the main control unit, when the main control unit is disabled or a fault of the main control unit occurs, thereby improving the braking stability of a vehicle, and a control method thereof In an embodiment, an electronic hydraulic brake device may include: a brake unit including a main brake unit configured to provide braking hydraulic pressure to a plurality of wheel cylinders through an operation of a motor, and an auxiliary brake unit connected to the main brake unit so as to be filled with high braking hydraulic pressure, and configured to provide braking hydraulic pressure to the plurality of wheel cylinders when an operation error of the main brake unit occurs; a first control unit configured to control the operation of the brake unit, and configured to control the auxiliary brake unit to operate when an operation error of the main brake unit occurs; and a second control unit configured to assist a part of the control of the main brake unit controlled by the first control unit and the control of the auxiliary brake unit. The first and second control units may determine whether each other's state is normal, through communication.

When the determination result indicates that the first control unit abnormally operates, the second control unit may perform a recovery operation of forcibly resetting the first control unit which abnormally operates, while performing a part of the operation of the first control unit. When the determination result indicates that the second control unit abnormally operates, the first control unit may perform a recovery operation of forcibly resetting the second control unit which abnormally operates.

The first control unit may include: a first-first control unit configured to control the operation of the main brake unit; and a first-second control unit configured to control the operation of the auxiliary brake unit, and control an operation of a stability control part which is included in the main brake unit and adjusts braking hydraulic pressure to be provided to the wheel cylinders. The second control unit may assist the control of the first-second control unit.

When a check result for the main brake unit by the first-first control unit, a check result for the auxiliary brake unit by the first-second control unit and a check result for the second control unit by the first control unit during a start-up of a vehicle indicate that all of the main brake unit, the auxiliary brake unit and the second control unit are normal, the first-second control unit may control preset pressure to be formed in the auxiliary brake unit. When the check result for the main brake unit by the first-first control unit, the check result for the auxiliary brake unit by the first-second control unit and the check result for the second control unit by the first control unit during the start-up of the vehicle indicate that a fault occurred in one or more of the main brake unit, the auxiliary brake unit and the second control unit, control suitable for the fault may be performed, and information on the situation in which the fault occurred and information on whether the vehicle is driven after the fault may be provided to a driver.

The main brake unit may include: a pedal cylinder configured to generate hydraulic pressure as a pedal is pressurized; a master cylinder configured to sense the pedal and generate hydraulic pressure through the operation of the motor; a first hydraulic part connected to the master cylinder, and configured to guide braking hydraulic pressure to some of the plurality of wheel cylinders; a second hydraulic part connected to the master cylinder, and configured to guide braking hydraulic pressure to the others of the plurality of wheel cylinders; and a hydraulic connection part configured to connect the first and second hydraulic parts or remove the connection.

The auxiliary brake unit may include: an auxiliary hydraulic part connected to any one of the first and second hydraulic parts to guide braking hydraulic pressure; an auxiliary accumulator connected to the auxiliary hydraulic part and filled with high braking hydraulic pressure; an auxiliary bypass part configured to guide braking hydraulic pressure to the auxiliary accumulator by bypassing the auxiliary hydraulic part; an auxiliary sensing part configured to measure hydraulic braking pressure of the auxiliary accumulator; and an auxiliary pump connected to a storage unit which is connected to the pedal cylinder so as to store braking hydraulic pressure, and transfer the braking hydraulic pressure stored in the storage unit to the auxiliary accumulator.

In an embodiment, a control method of an electronic hydraulic brake device may include: controlling, by a first control unit, an operation of a brake unit, and controlling an auxiliary brake unit to operate when an operation error of a main brake unit occurs, wherein the brake unit includes the main brake unit configured to provide braking hydraulic pressure to a plurality of wheel cylinders through an operation of a motor, and the auxiliary brake unit connected to the main brake unit so as to be filled with high braking hydraulic pressure, and configured to provide braking hydraulic pressure to the plurality of wheel cylinders when an operation error of the main brake unit occurs; and assisting, by a second control unit, a part of the control of the main brake unit controlled by the first control unit and the control of the auxiliary brake unit. The first and second control units may determine whether each other's state is normal, through communication.

The control method may further include: performing, the second control unit, a recovery operation of forcibly resetting the first control unit which abnormally operates, while performing a part of the operation of the first control unit, when the result obtained by determining each other's state through the communication indicates that the first control unit abnormally operates; and performing, by the first control unit, a recovery operation of forcibly resetting the second control unit which abnormally operates, when the result obtained by determining each other's state through the communication indicates that the second control unit abnormally operates.

The controlling of the operation of the brake unit may include: controlling, by a first-first control unit, the operation of the main brake unit; and controlling, by a first-second control unit, an operation of the auxiliary brake unit, and controlling an operation of a stability control unit which is included in the main brake unit and adjusts braking hydraulic pressure to be provided to the wheel cylinders. The assisting of the part of the control of the main brake unit may include assisting the control of the first-second control unit.

The control method may further include: controlling preset pressure to be formed in the auxiliary brake unit under control of the first-second control unit, when a check result for the main brake unit by the first-first control unit, a check result for the auxiliary brake unit by the first-second control unit and a check result for the second control unit by the first control unit during a start-up of a vehicle indicate that all of the main brake unit, the auxiliary brake unit and the second control unit are normal; and performing control suitable for a fault and providing a driver with information on the situation in which the fault occurred and information on whether the vehicle is driven after the fault, when the check result for the main brake unit by the first-first control unit, the check result for the auxiliary brake unit by the first-second control unit and the check result for the second control unit by the first control unit during the start-up of the vehicle indicate that a fault occurred in one or more of the main brake unit, the auxiliary brake unit and the second control unit.

In addition, another method and system for implementing the present disclosure and a computer program for executing the method may be further provided.

In accordance with the present embodiments, the electronic hydraulic brake device including the auxiliary brake device for assisting the main brake device may be added to an autonomous driving system, and operate the auxiliary brake device in case of a fault of the main brake device, in order to stably brake a vehicle without a driver's operation.

Furthermore, the electronic hydraulic brake device may include the main control unit for controlling the electronic hydraulic brake device and the sub control unit for monitoring the main control unit, and control the sub control unit to perform braking control in place of the main control unit, when the main control unit is disabled or a fault of the main control unit occurs, thereby improving the braking stability of the vehicle.

BRIEF DESCRIPTION OF THE DRAWINGS

FIG. 8 is a table for describing a control determination algorithm for each control unit fault during driving in FIG. 7.

DETAILED DESCRIPTION OF THE ILLUSTRATED EMBODIMENTS

The advantages and characteristics of the present disclosure and a method for achieving the advantages and characteristics will be clarified through the following embodiments which will be described in detail with reference to the accompanying drawings. However, it should understood that the present disclosure is not limited to the following embodiments, can be embodied in various different forms, and includes all modifications, equivalents or substitutes which are included in the scope and technical range of the present disclosure. The following embodiments are provided to complete the disclosure of the present disclosure, such that the scope of the present disclosure can be fully understood by those skilled in the art to which the present disclosure pertains. Moreover, detailed descriptions related to publicly known functions or configurations will be ruled out in order not to unnecessarily obscure subject matters of the present disclosure.

The terms used in this application are only used to describe a specific embodiment, and not intended to limit the present disclosure. The terms of a singular form may include plural forms unless referred to the contrary. In this application, it should be understood that the meaning of "include" or "have" specifies a property, a number, a step, a process, an element, a component, or combinations thereof, but does not exclude in advance one or more other properties, numbers, steps, processes, elements, components, or combinations thereof. The terms such as first and second may be used to describe various elements, but the elements should not be limited by the terms. The terms are used only to distinguish one element from another element.

Hereafter, embodiments of the present disclosure will be described in detail with reference to the accompanying drawings. In the following descriptions with reference to the accompanying drawings, the same or corresponding elements will be denoted by like reference numerals, and the overlapping descriptions thereof will be omitted.

Figure 1:
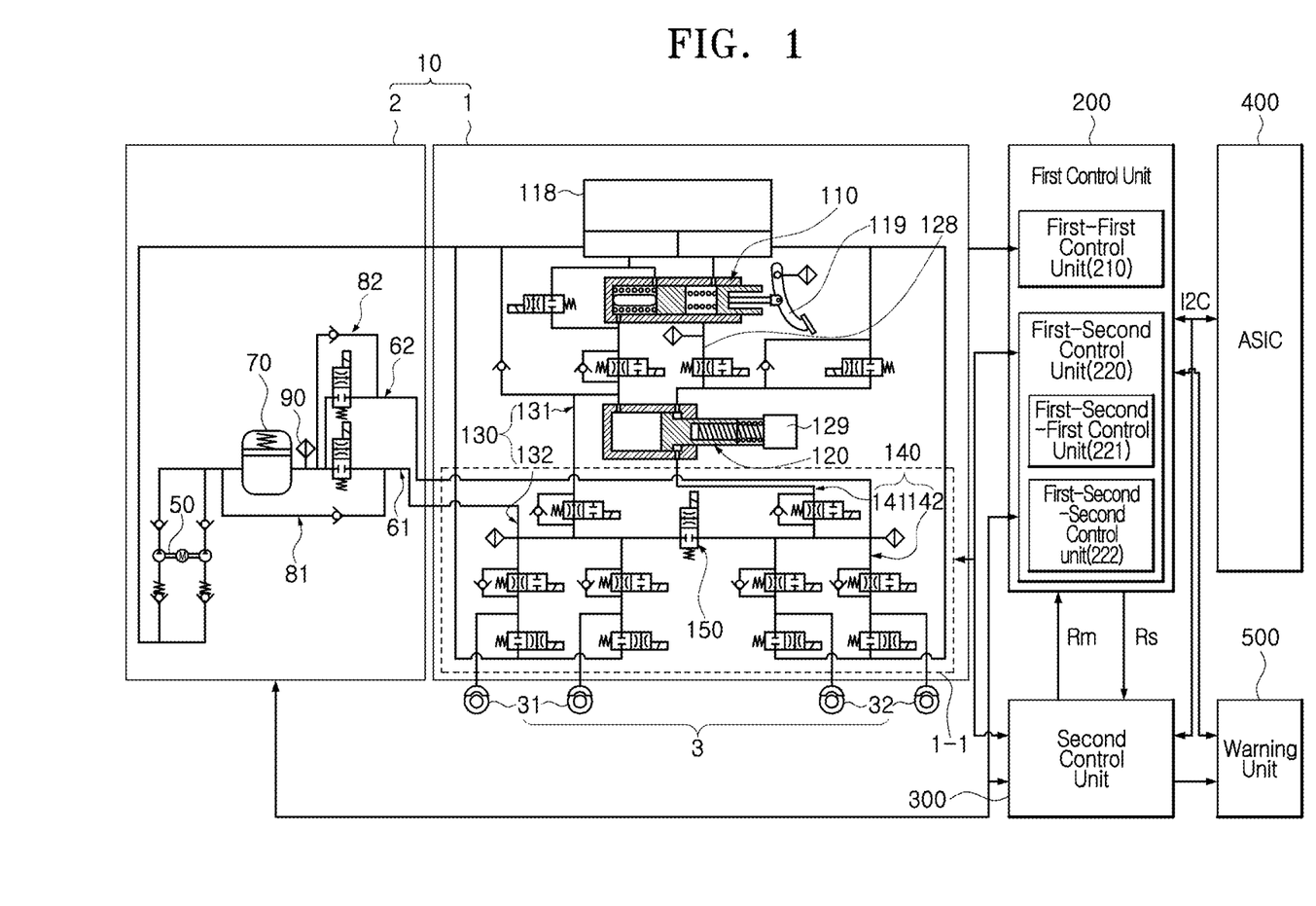
FIG. 1 is a diagram for schematically describing an electronic hydraulic brake device in accordance with an embodiment of the present disclosure.

FIG. 1 is a diagram for schematically describing an electronic hydraulic brake device in accordance with an embodiment of the present disclosure. Referring to FIG. 1, the electronic hydraulic brake device may include a brake unit 10, a first control unit 200, a second control unit 300, an ASIC (Application Specific Integrated Circuit) 300 and a warning unit 500.

The brake unit 10 may include a main brake unit 1 and an auxiliary brake unit 2. The main brake unit 1 may drive a motor to provide brake hydraulic pressure to a plurality of wheel cylinders 3. The auxiliary brake unit 2 may be connected to the main brake unit 1, and filled with high brake hydraulic pressure. The auxiliary brake unit 2 may provide brake hydraulic pressure to the plurality of wheel cylinders 3, when an operation error of the main brake unit 1 occurs. That is, the electronic hydraulic brake device in accordance with the embodiment of the present disclosure may have a structure in which an electronic brake device of an electric/hybrid vehicle or autonomous vehicle is divided into the main brake unit 1 and the auxiliary brake unit 2. Furthermore, when an operation error of the main brake unit 1 occurs, the high brake hydraulic pressure stored in the auxiliary brake unit 2 may be rapidly supplied to the wheel cylinders 3 to perform emergency braking. At this time, the operation error of the main brake unit 1 may include an error caused by the disabled motor or operation errors of various valves for controlling a hydraulic circuit.

In the present embodiment, the main brake unit 1 may include a pedal cylinder 110, a master cylinder 120, a first hydraulic part 130, a second hydraulic part 140 and a hydraulic connection part 150. The pedal cylinder 110 may generate hydraulic pressure as a pedal 119 is pressurized. The pedal cylinder 110 may form two chambers, and provide a pedal force corresponding to the pressurization of the pedal 119. The master cylinder 120 may sense whether the pedal 119 is operated, and generate hydraulic pressure through the operation of a motor 129. The master cylinder 120 may form one chamber, and the motor 129 may be driven in the forward or reverse direction according to the pressurization state of the pedal 119. The master cylinder 120 may be connected to the pedal cylinder 110 through a cylinder line 128. The first hydraulic part 130 may be connected to the master cylinder 120, and guide the brake hydraulic pressure to some of the plurality of wheel cylinders 3. For example, the first hydraulic part 130 may guide hydraulic pressure to first wheel cylinders 31 which are mounted on any one of two front wheels and any one of two rear wheels, respectively. More specifically, the first hydraulic part 130 may include a first-first hydraulic line 131 and a first-second hydraulic line 132. The first-first hydraulic line 131 may be connected to the master cylinder 120 to guide brake hydraulic pressure, and the first-second hydraulic line 132 may be connected to the first-first hydraulic line 131 and diverge to guide hydraulic pressure to the first wheel cylinders 31. The second hydraulic part 140 may be connected to the master cylinder 120, and guide brake hydraulic pressure to the others of the plurality of wheel cylinders 3. For example, the second hydraulic part 140 may guide brake hydraulic pressure to second wheel cylinders 32 which are mounted on the other of the two front wheels and the other of the two rear wheels, respectively. More specifically, the second hydraulic part 140 may include a second-first hydraulic line 141 and a second-second hydraulic line 142. The second-first hydraulic line 141 may be connected to the master cylinder 120 to guide brake hydraulic pressure, and the second-second hydraulic line 142 may be connected to the second-first hydraulic line 141 and diverge to guide brake hydraulic pressure to the second wheel cylinders 32. The hydraulic connection part 150 may connect the first and second hydraulic parts 130 and 140 or remove the connection. For example, the hydraulic connection part 150 may connect the first-second hydraulic line 132 and the second-second hydraulic line 142.

In the present embodiment, the auxiliary brake unit 2 may include an auxiliary pump 50, a first auxiliary hydraulic part 61, a second auxiliary hydraulic part 62, an auxiliary accumulator 70, a first auxiliary bypass part 81, a second auxiliary bypass part 82 and an auxiliary sensing part 90. At this time, the hydraulic connection part 150 may restrict brake hydraulic pressure from moving between the first and second hydraulic parts 130 and 140, in order to maintain the state in which the first and second hydraulic parts 130 and 140 are separated. The auxiliary pump 50 may be connected to a storage part 118 which is connected the pedal cylinder 110 so as to temporarily store brake hydraulic pressure, and forcibly transfer the brake hydraulic pressure stored in the storage part 118 to the auxiliary accumulator 70. Since brake hydraulic pressure can be continuously supplied to the auxiliary accumulator 70 through the auxiliary pump 50, vehicle braking may be continuously performed even when there occurs an operation error of the main brake unit 1, such as a fault of the motor 129. The first auxiliary hydraulic part 61 may be connected to the first hydraulic part 130 so as to guide brake hydraulic pressure, and the second auxiliary hydraulic part 62 may be connected to the second hydraulic part 140 so as to guide brake hydraulic pressure. The first auxiliary hydraulic part 61 may be connected to the first-second hydraulic line 132, and the second auxiliary hydraulic part 62 may be connected to the second-second hydraulic line 142. The auxiliary accumulator 70 may be connected to the auxiliary pump 50, the first auxiliary hydraulic part 61 and the second auxiliary hydraulic part 62, and filled with high brake hydraulic pressure. The first auxiliary bypass part 81 may guide brake hydraulic pressure to the auxiliary accumulator 70 by bypassing the first auxiliary hydraulic part 61, and the second auxiliary bypass part 82 may guide brake hydraulic pressure to the auxiliary accumulator 70 by bypassing the second auxiliary hydraulic part 62. For example, the auxiliary accumulator 70 may be filled with brake hydraulic pressure through the first or second auxiliary bypass part 81 or 82, and the brake hydraulic pressure of the auxiliary accumulator 70 may be moved to each of the first and second auxiliary bypass parts 81 and 82. The auxiliary sensing part 90 may measure the brake hydraulic pressure of the auxiliary accumulator 70. For example, the auxiliary sensing part 90 may be formed in the first and second auxiliary hydraulic parts 61 and 62 or the auxiliary accumulator 70, in order to measure brake hydraulic pressure. In such a state, the motor 129 may be driven to fill the auxiliary accumulator 70 with high brake hydraulic pressure at the initial stage. Then, the brake hydraulic pressure generated by the master cylinder 120 may be moved to the auxiliary accumulator 70. At this time, the movement of the brake hydraulic pressure to the cylinder line 128 may be restricted, and the movement of the brake hydraulic pressure to the first and second wheel cylinders 31 and 32 may be restricted. When an operation error of the main brake unit 1 occurs in the case that the vehicle needs to be braked, the high brake hydraulic pressure stored in the auxiliary accumulator 70 may be moved to the first-second hydraulic line 132 and the second-second hydraulic line 142, and then moved to the first and second wheel cylinders 31 and 32. At this time, the movement of the brake hydraulic pressure to the first-first hydraulic line 131 and the second-first hydraulic line 141 may be restricted. When the first-first hydraulic line 131 and the second-first hydraulic line 141 are opened while the vehicle is braked by the auxiliary brake unit 2, the brake hydraulic pressure of the wheel cylinder 3 may be relieved. In addition, when the brake hydraulic pressure needs to be rapidly relieved as in vehicle stability control, the brake hydraulic pressure applied to the wheel cylinder 3 may be adjusted by controlling valves of the first-second hydraulic line 132 and the second-second hydraulic line 142.

In the embodiment of the present disclosure, the first control unit 200 may serve as a main control unit which can control the entire operation of the brake unit 10 including the main brake unit 1 and the auxiliary brake unit 2, and control the auxiliary brake unit 2 to operate when an operation error of the main brake unit 1 occurs. The second control unit 300 may serve as a sub control unit which assists the control of the auxiliary brake unit 2 controlled by the first control unit 200 and the control (stability control) of the brake hydraulic pressure provided to the wheel cylinders 3. In the present embodiment, the first and second control units 200 and 300 may determine whether each other's state is normal, through communication.

Between the first and second control units 200 and 300, two hardware digital signals Rm and Rs may be used for hard reset, and the first control unit 200, the second control unit 300 and the ASIC 400 may perform I2C (Inter-Integrated Communication). Sensors (not illustrated) are connected to each of the first and second control units 200 and 300, and a sensor value and a fault value which are transferred through the ASIC 400 are inputted to each of the first control unit 200 and the second control unit 300 through an I2C line. In the present embodiment, the ASIC 400 may include a motor drive and a valve drive which supply a current to a motor and a valve, under control of the first control unit 200. When the operation of the vehicle is started, the first control unit 200 may be set to a master control unit, the second control unit 300 may be set to a slave control unit, and the ASCI 400 may be fixed to a slave. The master control unit may perform vehicle braking control, and the slave control unit may determine the state of the master control unit, the state of the vehicle, a computation state and the like. When the master control unit cannot serve as the master any more, the slave control unit may be switched to the master control unit, and serve as the master in I2C. Then, the master control unit which has failed may be reset and recovered. When the master control unit is completely recovered, the master control unit and the slave control unit may be time-synchronized, and the previous master control unit may be switched to the slave control unit and serve as the slave. In order to fundamentally prevent an error caused by a memory (not illustrated) sharing method, each of the first and second control units 200 and 300 may be configured as an independent component having a separate memory. The first control unit 200 used in the present embodiment may be construed as a similar meaning to the main control unit and the master control unit or construed as including the main control unit and the master control unit. The second control unit 300 used in the present embodiment may be construed as a similar meaning to the sub control unit and the slave control unit or construed as including the sub control unit and the slave control unit.

In another embodiment of the present disclosure, the first control unit 200 serving as the main control unit may include a first-first control unit 210 and a first-second control unit 220. The first-first control unit 210 may serve as a main brake control unit for controlling an operation of the main brake unit 1, and the first-second control unit 220 may serve as an auxiliary brake control unit for controlling an operation of a stability control part 1-1 of the main brake unit 1 and an operation of the auxiliary brake unit 2. The stability control part 1-1 may include valves for adjusting brake hydraulic pressure supplied to the wheel cylinders 3. The first-second control unit 220 may include a first-second-first control unit 221 serving as a stability control unit for controlling the operation of the stability control part 1-1 of the main brake unit 1 and a first-second-second control unit 222 serving as a backup brake control unit for controlling the operation of the auxiliary brake unit 2. The auxiliary brake control unit may be construed as a similar meaning to the backup brake control unit or construed as including the backup brake control unit. Furthermore, the second control unit 300 serving as the sub control unit may assist an operation of the first-second control unit 220, i.e. an operation of the first-second-first control unit 221 serving as the stability control unit for controlling the operation of the stability control part 1-1 of the main brake unit 1 and an operation of the first-second-second control unit 222 serving as the backup brake control unit for controlling the operation of the auxiliary brake unit 2. When an operation error of the main brake unit 1 occurs, the first control unit 200 may control the auxiliary brake unit 2 to operate. When the first control unit 200 is disabled or an operation error of the first control unit 200 occurs, the second control unit 300 may replace a part of the operation of the first control unit 200. When one or more of the brake unit 10 and the control units are abnormally operated, the warning unit 500 may output a warning light or warning sound and provide information on whether the operation is possible, such that the driver recognizes the abnormality. The abnormality used in the present embodiment may be analyzed as a similar meaning to a fault or error occurrence, or analyzed as including a fault and error occurrence.

Figure 2:
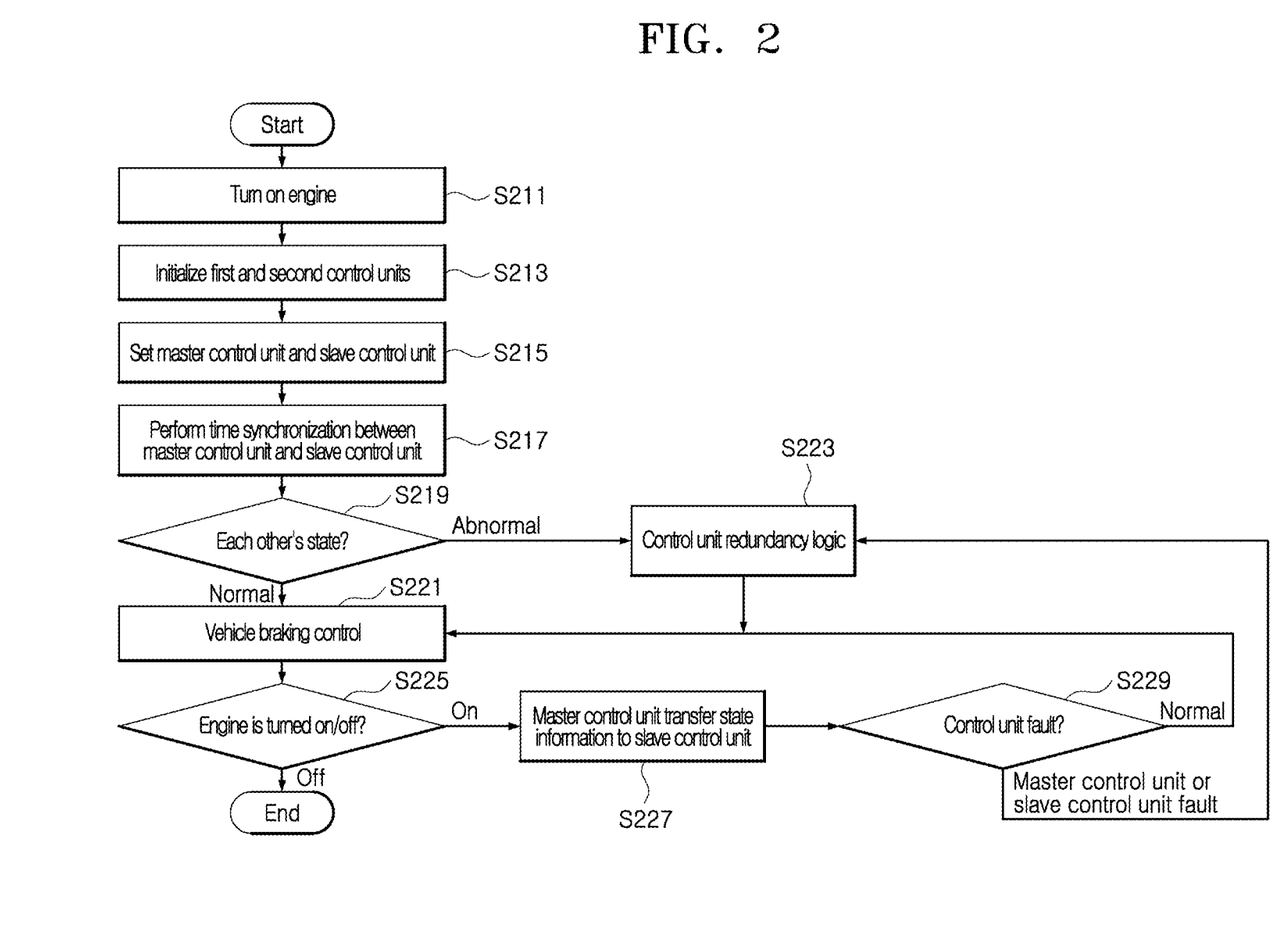
FIGS. 2 to 4 are flowcharts for describing a control method of an electronic hydraulic brake device in accordance with an embodiment of the present disclosure.

FIG. 2 is a flowchart illustrating a control method of an electronic hydraulic brake device for a vehicle in accordance with an embodiment of the present disclosure. In the following description, the descriptions of contents overlapping those of FIG. 1 will be omitted. Referring to FIG. 2, when an engine is turned on in step S211, the first control unit 200 and the second control unit 300 are initialized in step S213, and the first control unit 200 is set to the master control unit and the second control unit 300 is set to the slave control unit in step S215. In step S217, the master control unit and the slave control unit perform time synchronization therebetween using SPI (Serial Peripheral Interface) communication. In step S219, the master control unit and the slave control unit determine each other's state. When the determination result of step S219 indicates that each other's state is normal, vehicle braking control is started in step S221. In step S223, the vehicle braking control is started through control unit redundancy logic. According to the control unit redundancy logic, the control units operate differently depending on each other's state. Then, the master control unit determines whether the engine is turned off, in step S225. When it is determined in step S225 that the engine is turned off, the master control unit ends the vehicle braking control. When it is determined in step S225 that the engine is turned on, the master control unit transfers current state information and a computation value to the slave control unit in step S227. In step S229, the slave control unit determines whether the master control unit failed, based on the data. When determining that the master control unit failed, the slave control unit performs vehicle braking by performing the control unit redundancy logic in step S223. Similarly, when determining the slave control unit failed, the master control unit performs the control unit redundancy logic to recover the slave control unit.

Figure 3:
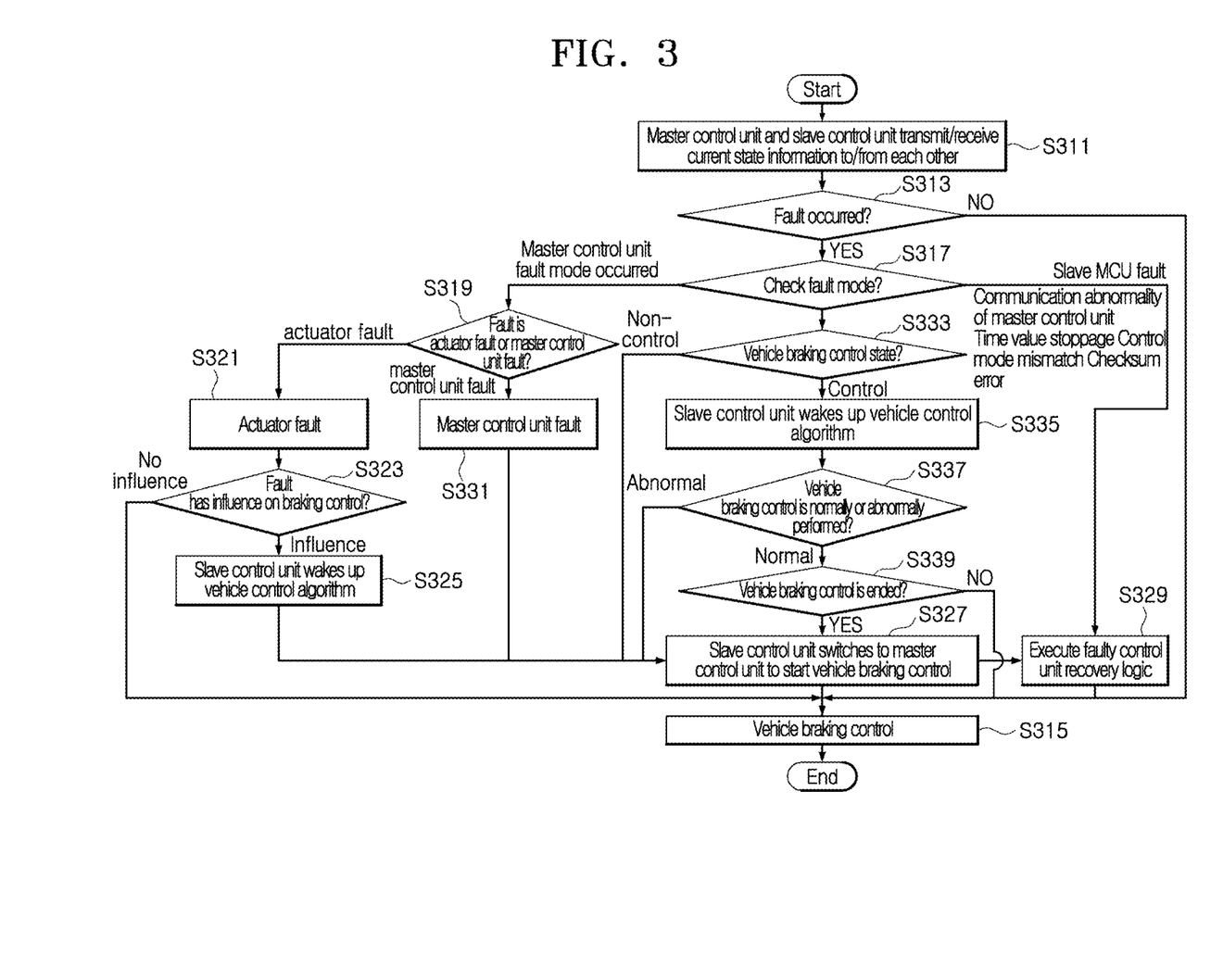

FIG. 3 is a flowchart illustrating a method for performing the control unit redundancy logic in step S223 of FIG. 2. In the following description, the descriptions of contents overlapping those of FIGS. 1 and 2 will be omitted. Referring to FIG. 3, it is important for the control unit redundancy logic to determine which control unit failed, whether the fault has an influence on control, and whether control is being performed at the moment. Since the master control unit and the slave control unit monitor each other and performs state switching (from the master to the slave or from the slave to the master), faulty control unit recovery logic is mounted on each of the master control unit and the slave control unit.

In step S311, the master control unit and the slave control unit transmit/receive current state information to/from each other. In step S313, the master control unit determines whether a fault occurred. When no fault occurs, vehicle braking control is performed in step S315.

In step S317, the master control unit may check a fault mode. When the fault is an existing fault with a fault code, the master control unit may determine whether the fault is an actuator fault or master control unit fault, in step S319. When it is determined at step S319 that the fault is the actuator fault, the master control unit determines whether the fault has an influence on braking control, in step S323. When the fault has no influence on the braking control, the master control unit does not perform state switching, but performs vehicle braking control in step S315. However, when the fault has an influence on the braking control, the slave control unit in an algorithm for monitoring a fault and determining only the current state wakes up a vehicle control algorithm, and switches to the master control unit to start the vehicle braking control, in step S327. Simultaneously, the faulty control unit recovery logic in step S329 is separately operated to recover the control unit in which the fault occurred. When it is determined in steps S319 and S331 that the fault is a master control unit fault, the slave control unit switches to the master control unit to start vehicle braking control in step S327. Simultaneously, the faulty control unit recovery logic is separately operated to recover the control unit in which the fault occurred, in step S329.

When the check result of step S317 indicates that a communication abnormality in the master control unit, time value stoppage, control mode mismatch, checksum error or the like occurred, the slave control unit may determine whether the vehicle performs braking control such as ABS or ESC, in step S333. When the vehicle does not perform braking control such as ABS or ESC, the slave control unit switches to the master control unit to start vehicle braking control in step S327. Simultaneously, the faulty control unit recovery logic in step S329 is separately operated to recover the control unit in which the fault occurred. However, when the vehicle performs braking control such as ABS or ESC, the slave control unit wakes up the vehicle control algorithm in step S335, and determines whether the vehicle braking control is normally or abnormally performed at the moment, in step S337. When the vehicle braking control is normally performed, the slave control unit does not perform state switching until the vehicle braking control is ended. Then, when the vehicle braking control is ended, the slave control unit switches to the master control unit to start the vehicle braking control in step S327. Simultaneously, the faulty control unit recovery logic in step S329 is separately operated to recover the control unit in which the fault occurred. When the vehicle braking control is abnormally performed, the slave control unit switches to the master control unit to start the vehicle braking control in step S327. Simultaneously, the faulty control unit recovery logic in step S329 is separately operated to recover the control unit in which the fault occurred.

When the check result of step S317 indicates that the fault is a fault of the slave control unit, only a communication abnormality, time value stoppage or checksum error may occur, because the slave control unit operates only as the minimum logic for monitoring a fault or determining the vehicle mode state. When the master control unit detects the fault of the slave control unit, the master control unit separately operates the faulty control unit recovery logic to recover the slave control unit in step S329.

Figure 4:
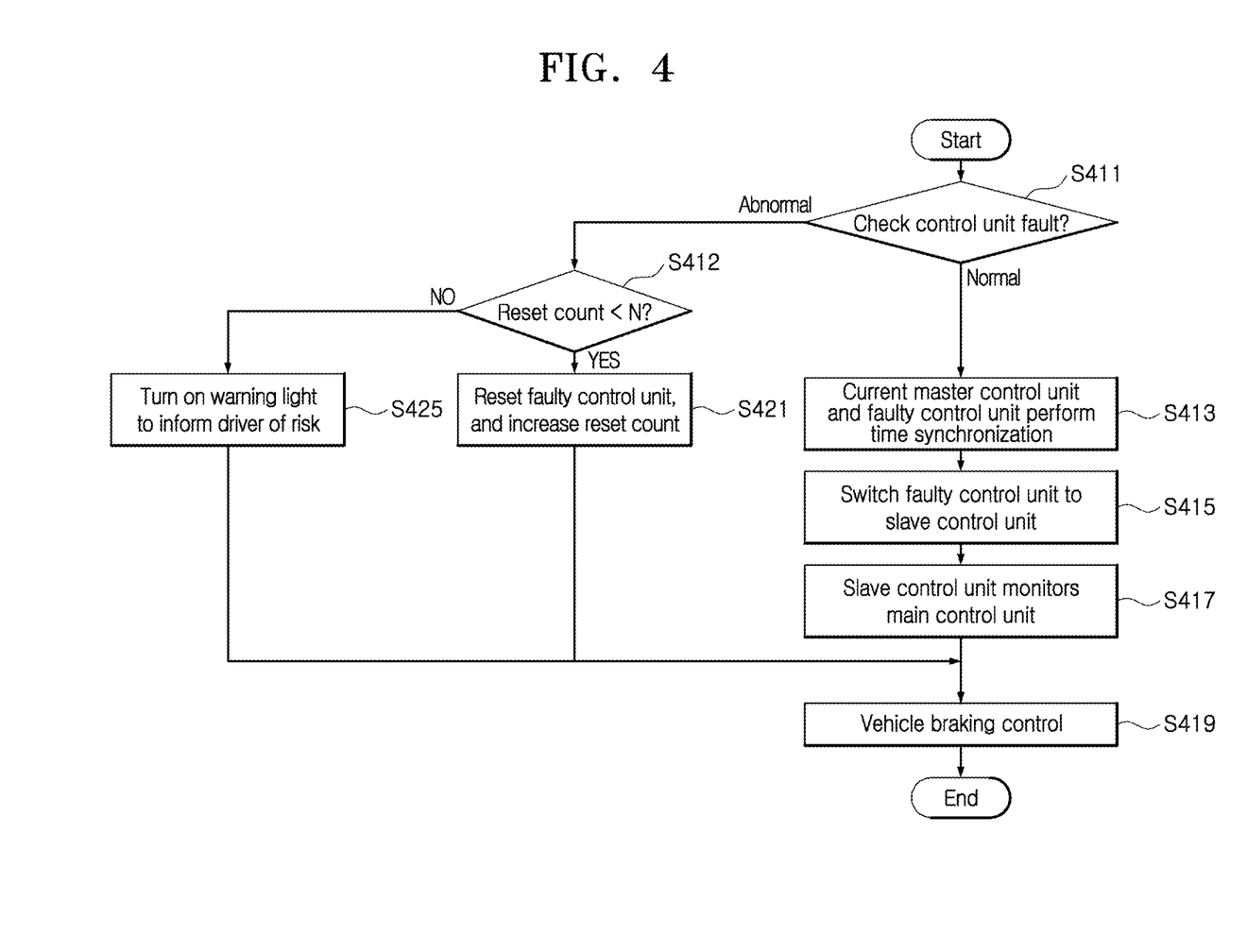

FIG. 4 is a flowchart illustrating a method for performing the faulty control unit recovery logic in step S329 in FIG. 3. In the following description, the descriptions of contents overlapping those of FIGS. 1 to 3 will be omitted. Referring to FIG. 4, the fault of the control unit is checked in step S411. When the faulty control unit is normal, the current master control unit and the faulty control unit perform time synchronization in step S413. In step S415, the faulty control unit switches to the slave control unit. Then, the slave control unit monitors the state of the master control unit in step S417, and performs the vehicle braking control in step S419. When it is checked in step S411 that the faulty control unit is abnormal, that is, when the control unit fault is not removed, the faulty control unit is forcibly reset through the Rm or Rs line. In steps S421 and S423, a reset count is increased, and the faulty control unit is forcibly reset at the next loop, when the reset count is smaller than a preset reference value N. When the reset count is larger than the reference value N, reset is stopped, a warning light included in the warning unit 500 is turned on to inform the driver of a driving risk, in step S425. Then, the process is returned to step S419 to perform vehicle braking control.

Figure 5:
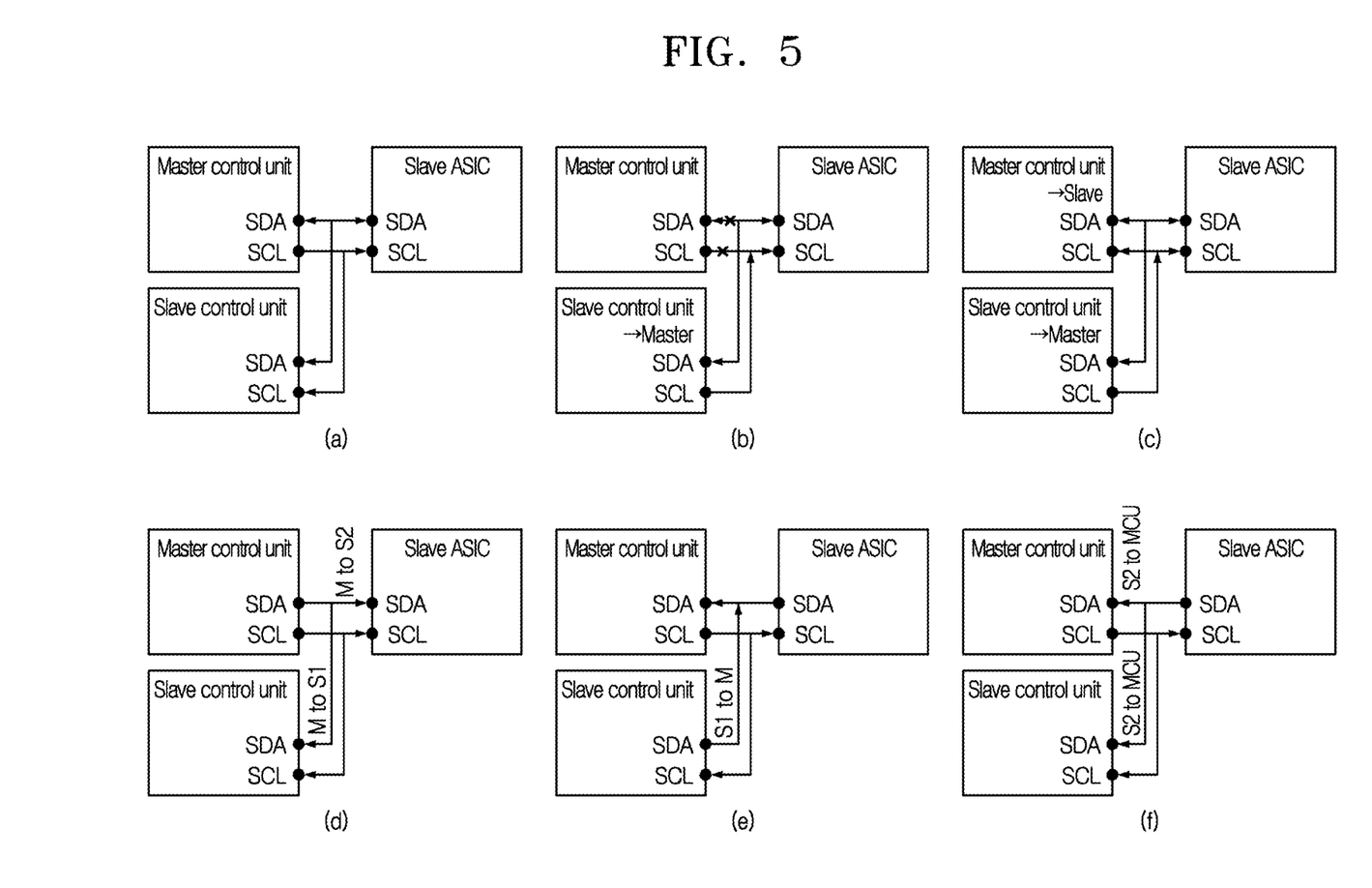
FIG. 5 is a diagram for describing I2C (Inter-Integrated Communication) and control unit redundancy flows among a first control unit, a second control unit and an ASIC (Application Specific Integrated Circuit), which are illustrated in FIG. 1.

FIGS. 5A to 5F are diagrams for describing I2C and control unit redundancy message flows among the first control unit 200, the second control unit 300 and the ASIC 400 which are illustrated in FIG. 1. In the following description, the descriptions of contents overlapping those of FIGS. 1 to 4 will be omitted. FIGS. 5A to 5C are diagrams for describing the I2C among the first control unit 200, the second control unit 300 and the ASIC 400, and FIGS. 5D to 5F are diagrams for describing the control unit redundancy message flows. Referring to FIG. 5A, the master control unit may generate a serial clock to synchronize communication between the slave control unit and the slave ASIC. When a fault occurs in the master control unit, the slave control unit may reset the master control unit as illustrated in FIG. 5B, and serve as the master to generate SCL (Serial Clock) data. When the master control unit is recovered, the master control unit may switch to the slave to monitor the master control unit, as illustrated in FIG. 5C. Referring to FIGS. 5D to 5F, the master control unit transmits an M-to-S2 message (message from master control unit to slave ASIC) to an ID allocated for the first time, and transmits an M-to-S1 message (message from master control unit to slave control unit) to an ID allocated for the second time. The slave control unit receives the M-to-S1 message, performs an operation on the received message, and transmits the operation result value as an S1-to-M message (message from slave control unit to master control unit) to an ID allocated thereto. The slave ASIC receives the M-to-S1 message, and transmits an S2-to-MCU message (message from slave ASIC to master control unit), and both of the master control unit and the slave control unit receive this message.

Figure 6:
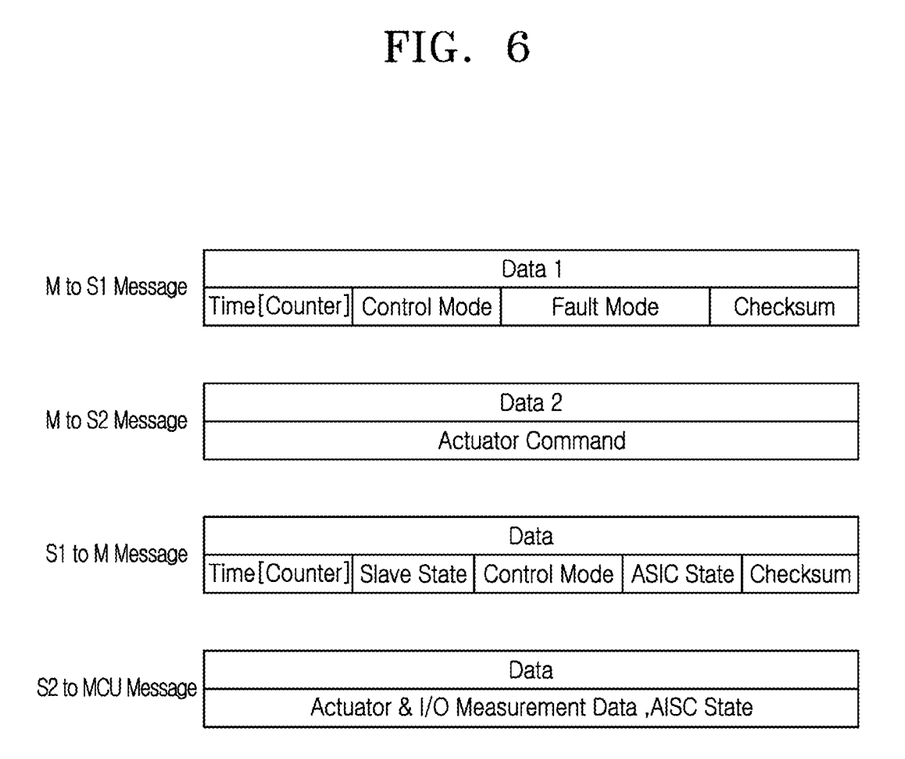
FIG. 6 is a diagram for describing a structure of a control unit redundancy message illustrated in FIG. 5.

FIG. 6 is a diagram illustrating the structures of the control unit redundancy messages illustrated in FIGS. 5A to 5F. In the following description, the descriptions of contents overlapping those of FIGS. 1 to 5 will be omitted. Referring to FIG. 6, a time counter of the M-to-S1 message and a time counter of the S1-to-M message are time synchronization values for synchronizing operation times. Since data bits are limited, the time counter has the same structure as a message counter. A control mode indicates a current vehicle control mode, and a fault mode includes a control unit fault and an ASIC fault. Through a checksum, data accuracy is verified.

Figure 7:
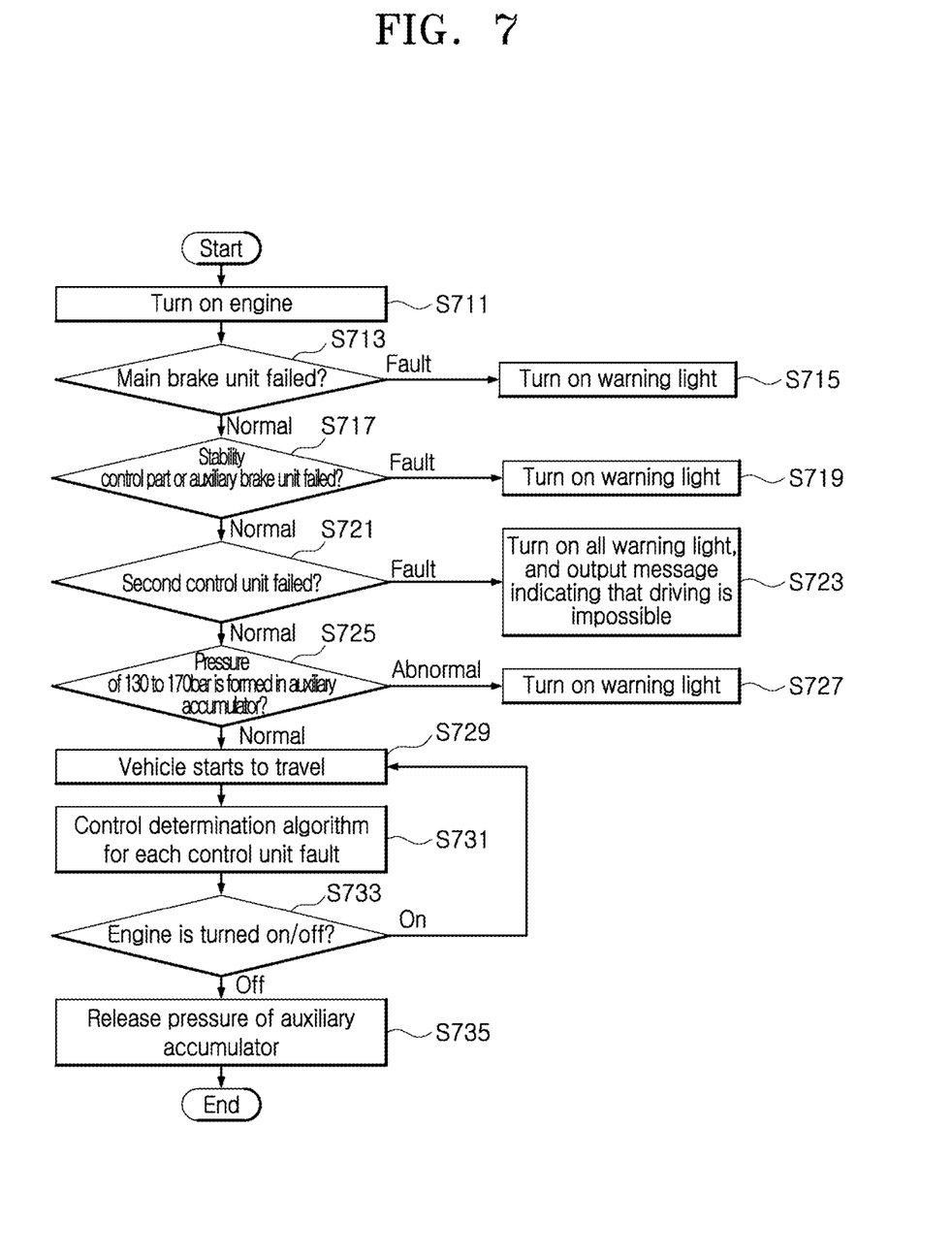
FIG. 7 is a flowchart illustrating a control method of an electronic hydraulic brake device in accordance with another embodiment of the present disclosure.

FIG. 7 is a flowchart illustrating a control method of an electronic hydraulic brake device in accordance with another embodiment of the present disclosure. The method of FIG. 7 may generate information to be stored in the fault mode of the message illustrated in FIG. 6. In the following description, the descriptions of contents overlapping those of FIGS. 1 to 6 will be omitted. Referring to FIG. 7, when a driver starts the vehicle in step S711, the first-first control unit checks whether the main brake unit 1 failed, in step S713. When the main brake unit 1 failed, the first-first control unit 210 controls the warning unit 500 to turn on a warning light in step S715. When the main brake unit 1 is normal, the first-second control unit 220 checks whether one or more of the stability control part 1-1 and the auxiliary brake unit 2 failed, in step S717. When one or more of the stability control part 1-1 and the auxiliary brake unit 2 failed, the first-second control unit 220 controls the warning unit 500 to turn on the warning light in step S719. When the stability control part 1-1 and the auxiliary brake unit 2 are normal, the first control unit 200 checks whether the second control unit 300 failed, in step S721. When the second control unit 300 failed, the first control unit 200 controls the warning unit 500 to turn on all warning lights related to vehicle braking, and outputs a message to inform the driver of a risk of the autonomous driving state, the message saying that the vehicle cannot be operated, in step S723. When the second control unit 300 is normal, the first control unit 200 checks whether a pressure of about 130 to 170 bar is normally formed in the auxiliary accumulator 70 included in the auxiliary brake unit 2, in step S725. When the pressure is abnormal, the first control unit 200 controls the warning unit 500 to turn on a warning light in step S727. When all the control units are normal, the vehicle starts to travel in step S729. Then, the first control unit 200 executes a control determination algorithm for each control unit fault to perform control suitable for the fault, in step S731. The first control unit 200 determines whether the engine is turned off in step S733. When the engine is turned off, the first control unit 200 releases the pressure of the auxiliary accumulator 70 included in the auxiliary brake unit 2 in step S735, and ends the control.

FIG. 8 is a table for describing the control determination algorithm in step S729 for each control unit fault during vehicle control in FIG. 7. In the following description, the descriptions of contents overlapping those of FIGS. 1 to 7 will be omitted. Referring to FIG. 8, the control determination algorithm for each control unit fault during vehicle control may include the operation states of the control units when one or more of the main brake unit 1, the auxiliary brake unit 2 and the second control unit 300 fail, the operation states of the control units when all of the main brake unit 1, the auxiliary brake unit 2 and the second control unit 300 are normal, the states of warnings for informing a driver of a risk, and information on whether the vehicle is driven. For example, when the main brake unit 1 failed, the first-first control unit 210 stops the main brake unit 1, the first-second-first control unit 221 performs stability control, the first-second-second control unit 222 controls the auxiliary brake unit 2, the second control unit 300 checks the state of the auxiliary brake unit 2 in a waiting state, and the warning unit 500 turns on a warning light indicating an abnormality of the main brake unit 1 and outputs a message indicating that autonomous driving is possible. For another example, when the second control unit 300 failed, the first-first control unit 210 controls the main brake unit 1, the first-second-first control unit 221 performs stability control, the first-second-second control unit 222 enters the waiting state to check the pressure of the auxiliary accumulator 70, the second control unit 300 is stopped, and the warning unit 500 turns on a warning light indicating the fault of the second control unit 300, and outputs a message for inducing the driver to drive the vehicle, while outputting a warning sound.

The above-described embodiments of the present disclosure may be implemented in the form of computer programs which can be executed on a computer through various components, and the computer programs may be recorded in a computer readable medium. At this time, the medium may include a magnetic medium such as a hard disk, floppy disk or magnetic tape, an optical medium such as CD-ROM or DVD, a magneto-optical medium such as a floptical disk, and a hardware device such as ROM, RAM or flash memory, which is configured to store and execute a program command.

The computer program may include an available program which is specifically designed and configured for the present disclosure, or publicly known to those skilled in the computer software field. Examples of the computer program may include high-level language codes which can be executed by a computer through an interpreter, as well as machine language codes which are generated by a compiler.

In the specification (or particularly the claims) of the present disclosure, the use of the term "the" and indication terms similar to "the" may correspond to both of a singular form and plural forms. Furthermore, when a range is described in the present disclosure, it indicates that the present disclosure includes an embodiment to which individual values belonging to the range are applied (unless referred to the contrary), and means that the individual values constituting the range are described in the detailed description of the disclosure.

The steps constituting the method in accordance with the embodiment of the present disclosure may be performed in suitable order, when the order of the steps is clearly specified or unless referred to the contrary. The present disclosure is not limited to the order of the steps. In the present disclosure, all examples or exemplary terms (for example, and the like) are simply used to describe the present disclosure in detail. The scope of the present disclosure is not limited by the examples or exemplary terms, as long as the scope of the present disclosure is limited by the claims. Furthermore, it is obvious to a person skilled in the art that various modifications, combinations and changes can be made according to design conditions and factors within the scope of appended claims or equivalents thereto.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An electronic hydraulic brake device comprising:
   a brake unit comprising a main brake unit configured to provide braking hydraulic pressure to a plurality of wheel cylinders through an operation of a motor, and an auxiliary brake unit connected to the main brake unit so as to be filled with high braking hydraulic pressure, and configured to provide braking hydraulic pressure to the plurality of wheel cylinders when an operation error of the main brake unit occurs;
   a first control unit configured to control the operation of the brake unit, and configured to control the auxiliary brake unit to operate when an operation error of the main brake unit occurs; and
   a second control unit configured to assist the first control unit to control a part of the operation of the main brake unit and to control the operation of the auxiliary brake unit,
   wherein the first and second control units determine whether each other's state is normal, through communication, and
   wherein when the determination result indicates that one of the first and the second control units abnormally operates, a remaining one of the first and the second control units performs a recovery operation of forcibly resetting the one of the first and the second control units which abnormally operates.

2. The electronic hydraulic brake device of claim 1, wherein the main brake unit comprises:
   a pedal cylinder configured to generate hydraulic pressure as a pedal is pressurized;
   a master cylinder configured to sense the pedal and generate hydraulic pressure through the operation of the motor;
   a first hydraulic part connected to the master cylinder, and configured to guide braking hydraulic pressure to some of the plurality of wheel cylinders;
   a second hydraulic part connected to the master cylinder, and configured to guide braking hydraulic pressure to the others of the plurality of wheel cylinders; and
   a hydraulic connection part configured to connect the first and second hydraulic parts or remove the connection.

3. The electronic hydraulic brake device of claim 2, wherein the auxiliary brake unit comprises:
   an auxiliary hydraulic part connected to any one of the first and second hydraulic parts to guide braking hydraulic pressure;
   an auxiliary accumulator connected to the auxiliary hydraulic part and filled with high braking hydraulic pressure;
   an auxiliary bypass part configured to guide braking hydraulic pressure to the auxiliary accumulator by bypassing the auxiliary hydraulic part;
   an auxiliary sensing part configured to measure hydraulic braking pressure of the auxiliary accumulator; and
   an auxiliary pump connected to a storage unit which is connected to the pedal cylinder so as to store braking hydraulic pressure, and transfer the braking hydraulic pressure stored in the storage unit to the auxiliary accumulator.

4. The electronic hydraulic brake device of claim 1, wherein when the determination result indicates that the first control unit abnormally operates, the second control unit performs a recovery operation of forcibly resetting the first control unit which abnormally operates, while performing a part of the operation of the first control unit,
   wherein when the determination result indicates that the second control unit abnormally operates, the first control unit performs a recovery operation of forcibly resetting the second control unit which abnormally operates.

5. An electronic hydraulic brake device comprising:
   a brake unit comprising a main brake unit configured to provide braking hydraulic pressure to a plurality of wheel cylinders through an operation of a motor, and an auxiliary brake unit connected to the main brake unit so as to be filled with high braking hydraulic pressure, and configured to provide braking hydraulic pressure to the plurality of wheel cylinders when an operation error of the main brake unit occurs;
   a first control unit configured to control the operation of the brake unit, and configured to control the auxiliary brake unit to operate when an operation error of the main brake unit occurs; and
   a second control unit configured to assist the first control unit to control a part of the operation of the main brake unit and to control the operation of the auxiliary brake unit,
   wherein the first and second control units determine whether each other's state is normal, through communication,
   wherein the first control unit comprises:

a first-first control unit configured to control the operation of the main brake unit; and a first-second control unit configured to control the operation of the auxiliary brake unit, and control an operation of a stability control part which is included in the main brake unit and adjusts braking hydraulic pressure to be provided to the wheel cylinders, wherein the second control unit assists the control of the first-second control unit.

6. The electronic hydraulic brake device of claim 5, wherein when a check result for the main brake unit by the first-first control unit, a check result for the auxiliary brake unit by the first-second control unit and a check result for the second control unit by the first control unit during a start-up of a vehicle indicate that all of the main brake unit, the auxiliary brake unit and the second control unit are normal, the first-second control unit controls preset pressure to be formed in the auxiliary brake unit, wherein when the check result for the main brake unit by the first-first control unit, the check result for the auxiliary brake unit by the first-second control unit and the check result for the second control unit by the first control unit during the start-up of the vehicle indicate that a fault occurred in one or more of the main brake unit, the auxiliary brake unit and the second control unit, control suitable for the fault is performed, and information on the situation in which the fault occurred and information on whether the vehicle is driven after the fault are provided to a driver.

7. A control method of an electronic hydraulic brake device, comprising:

controlling, by a first control unit, an operation of a brake unit, and controlling an auxiliary brake unit to operate when an operation error of a main brake unit occurs, wherein the brake unit includes the main brake unit configured to provide braking hydraulic pressure to a plurality of wheel cylinders through an operation of a motor, and the auxiliary brake unit connected to the main brake unit so as to be filled with high braking hydraulic pressure, and configured to provide braking hydraulic pressure to the plurality of wheel cylinders when an operation error of the main brake unit occurs; and assisting, by a second control unit, the first control unit to control a part of the operation of the main brake unit and to control the operation of the auxiliary brake unit, wherein the first and second control units determine whether each other's state is normal, through communication, and wherein the control method further comprises when the result obtained by determining each other's state through the communication indicates that one of the first and the second control units abnormally operates, performing, by a remining one of the first and the second control units, a recovery operation of forcibly resetting the one of the first and the second control units which abnormally operates.

8. The control method of claim 7, further comprising:

performing, the second control unit, a recovery operation of forcibly resetting the first control unit which abnormally operates, while performing a part of the operation of the first control unit, when the result obtained by determining each other's state through the communication indicates that the first control unit abnormally operates; and performing, by the first control unit, a recovery operation of forcibly resetting the second control unit which abnormally operates, when the result obtained by determining each other's state through the communication indicates that the second control unit abnormally operates.

9. A control method of an electronic hydraulic brake device, comprising:

controlling, by a first control unit, an operation of a brake unit, and controlling an auxiliary brake unit to operate when an operation error of a main brake unit occurs, wherein the brake unit includes the main brake unit configured to provide braking hydraulic pressure to a plurality of wheel cylinders through an operation of a motor, and the auxiliary brake unit connected to the main brake unit so as to be filled with high braking hydraulic pressure, and configured to provide braking hydraulic pressure to the plurality of wheel cylinders when an operation error of the main brake unit occurs; and assisting, by a second control unit, the first control unit to control a part of the operation of the main brake unit and to control the operation of the auxiliary brake unit, wherein the first and second control units determine whether each other's state is normal, through communication, wherein the controlling of the operation of the brake unit comprises:

controlling, by a first-first control unit, the operation of the main brake unit; and controlling, by a first-second control unit, an operation of the auxiliary brake unit, and controlling an operation of a stability control unit which is included in the main brake unit and adjusts braking hydraulic pressure to be provided to the wheel cylinders, wherein the assisting of the part of the control of the main brake unit comprises assisting the control of the first-second control unit.

10. The control method of claim 9, further comprising:

controlling preset pressure to be formed in the auxiliary brake unit under control of the first-second control unit, when a check result for the main brake unit by the first-first control unit, a check result for the auxiliary brake unit by the first-second control unit and a check result for the second control unit by the first control unit during a start-up of a vehicle indicate that all of the main brake unit, the auxiliary brake unit and the second control unit are normal; and performing control suitable for a fault and providing a driver with information on the situation in which the fault occurred and information on whether the vehicle is driven after the fault, when the check result for the main brake unit by the first-first control unit, the check result for the auxiliary brake unit by the first-second control unit and the check result for the second control unit by the first control unit during the start-up of the vehicle indicate that a fault occurred in one or more of the main brake unit, the auxiliary brake unit and the second control unit.

* * * * *